United States Patent [19]
Grebier et al.

[11] 3,871,920
[45] Mar. 18, 1975

[54] AIR DEPOLARIZED CELL

[75] Inventors: Gerard Grebier, Biard-Poitiers; Pierre Arlot, Chasseneuil, both of France

[73] Assignee: Saft-Societe Des Accumulateurs Fixes Et De Traction, Romainville, France

[22] Filed: Apr. 24, 1973

[21] Appl. No.: 353,992

[30] Foreign Application Priority Data
Aug. 25, 1972 France .............................. 72.30383

[52] U.S. Cl................................................ 136/86 A
[51] Int. Cl. .......................................... H01m 29/04
[58] Field of Search ....................................... 136/86

[56] References Cited
UNITED STATES PATENTS

| | | | |
|---|---|---|---|
| 2,938,064 | 5/1960 | Kordesch.......................... | 136/86 A |
| 3,146,131 | 8/1964 | Linden et al...................... | 136/86 R |
| 3,147,149 | 9/1964 | Postal............................... | 136/86 R |
| 3,429,749 | 2/1969 | Baukal.............................. | 136/86 F |
| 3,682,706 | 8/1972 | Yardney et al. .................. | 136/86 A |
| 3,697,326 | 10/1972 | Jammet............................ | 136/86 A |

FOREIGN PATENTS OR APPLICATIONS

| | | | |
|---|---|---|---|
| 1,256,419 | 12/1971 | United Kingdom .............. | 136/86 A |
| 1,482,269 | 4/1967 | France | |

*Primary Examiner*—Allen B. Curtis
*Attorney, Agent, or Firm*—Kenyon & Kenyon Reilly Carr & Chapin

[57] ABSTRACT

An air depolarized electrochemical cell comprising a negative electrode, electrolyte and a positive electrode provided with a flue. Air is introduced into the flue which has a partitioning element located internally of the flue. The length of the partitioning element is approximately equal to the height of said flue. The partitioning element delimits separate chambers in the flue of different volumes that communicate at their lower portions and whose proportionality coefficient at the air arrival surfaces of the positive electrode via perforations of like numbers at catalytic sites of the said positive electrode with respect to corresponding chamber volumes are different.

12 Claims, 7 Drawing Figures

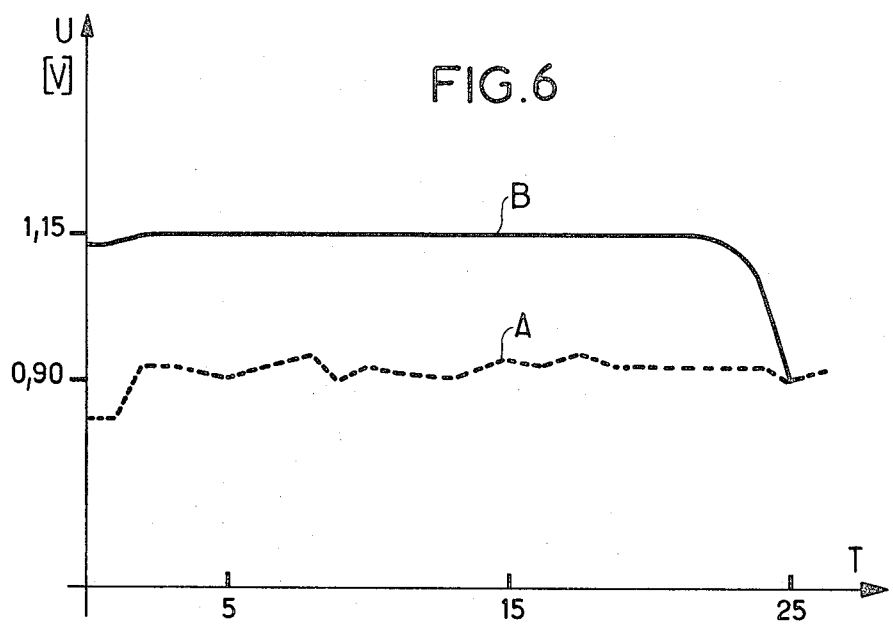
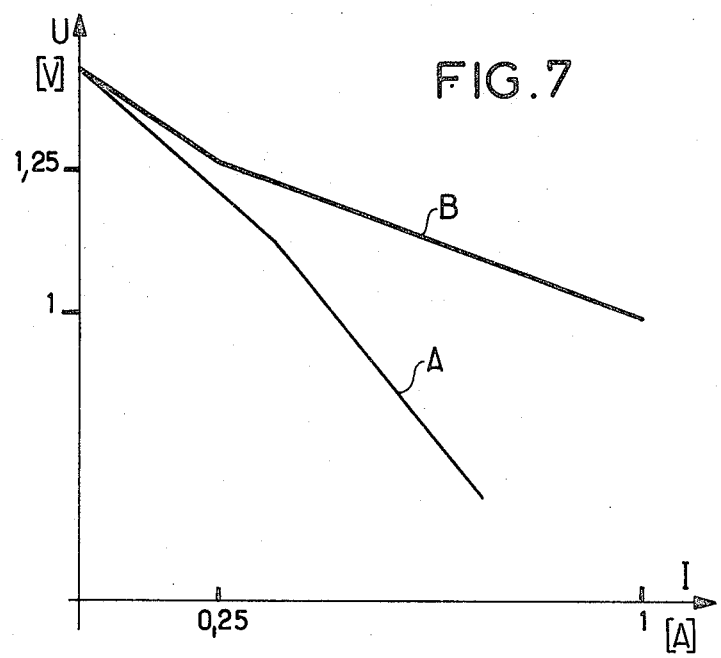

AIR DEPOLARIZED CELL

The instant invention relates to air depolarization cells, preferably to air-zinc cells. To improve the operation of such cells and in particular the operation of the positive electrode, it is already known to cause the air to arrive through a central flue or chimney arranged in the positive electrode and one end of which opens to atmosphere.

Such an arrangement is for instance described, in the U.S. Pat. No. 2,213,429. However, even though this is an interesting arrangement, it is not ideal because the air inside of the flue is not satisfactorily changed or renewed during operation, thus restricting the performance of the cell. In particular, the natural circulation of air occurs with difficulty along the walls of the flue.

It is an object of the instant invention to improve the circulation of air in air depolarized cells and, consequently, to maintain a high partial pressure of oxygen at the catalytic sites of the positive electrode where, during cell operation, it is being consumed through reduction.

Further objects and features of the instant invention are the provision of an air depolarization cell comprising a negative electrode, preferably a zinc base electrode, an electrolyte, and a positive electrode supplied with air by means of a central flue or chimney provided in the said positive electrode and communicating with the ambient atmospheric outside air at its upper part; the said cell is characterized by the fact that this flue includes on its inside a partition element whose length is substantially equal to the length of the said flue, said partitional element defining at least two longitudinal chambers communicating at their lower portions, the proportionality coefficients of the areas of air arrival at the catalytic sites of the positive electrode with respect to the corresponding volumes of the said chambers being different.

In a preferred embodiment, the partition element situated inside the flue has a transverse cross-section in the shape of the letter H, with the two extremities of each one of the two vertical bars of the said H abutting the inside wall of the tubular flue.

In a variant of the device according to the invention, the partition element comprises a flat sheet whose width relative to the flue diameter is such that, upon introduction of this sheet into the flue, it is deformed to curved shape due to its elasticity.

Other objects, features and characteristics of the invention will become apparent from the exemplified embodiments described below purely by way of illustration and not limitatively, with reference to the annexed drawing in which:

FIG. 6 is a graph which depicts comparative evolution curves of the voltage as a function of time, respectively, for a cell according to the invention and for a cell in accordance with the prior art; and FIG. 7 is a graph which depicts comparative characteristic curves of the voltage as a function of the intensity of the current supplied to an outside or load circuit.

DETAILED DESCRIPTION

Figure 1:
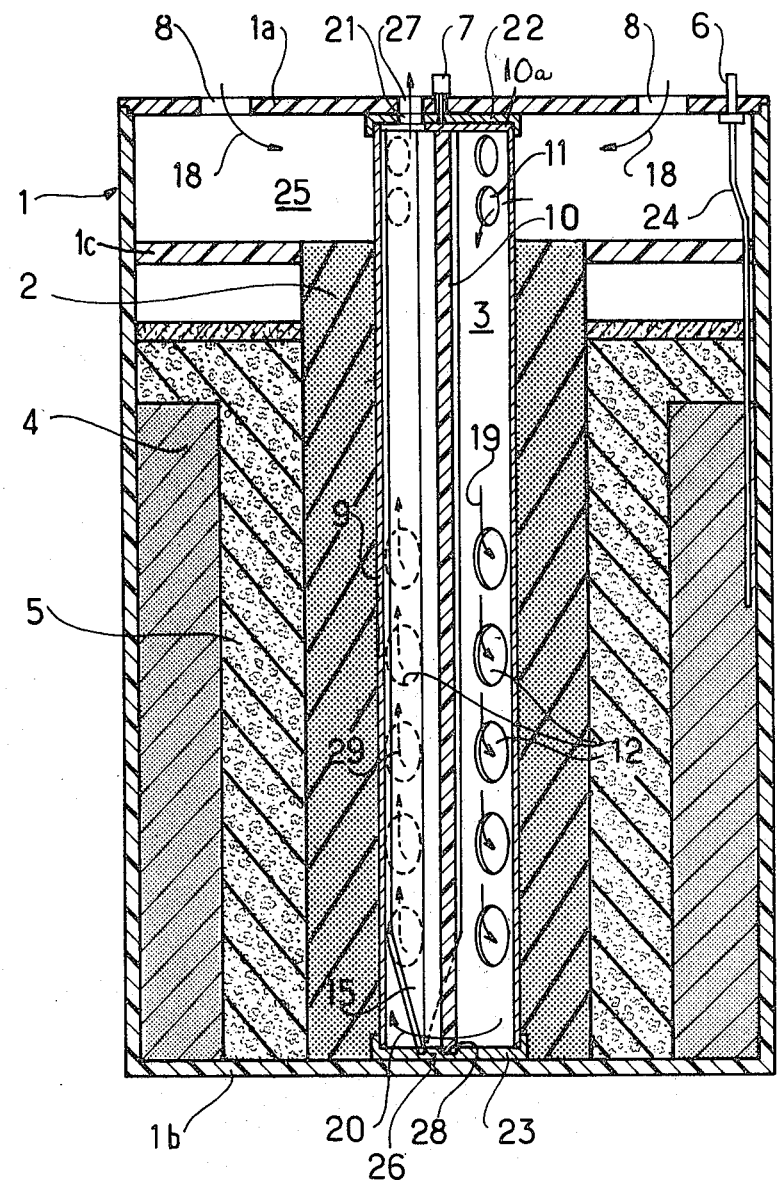
FIG. 1 is a vertical axial cross-sectional view of a cell according to the invention taken along a line I—I of FIG. 3.

The cell according to the invention, illustrated in FIG. 1, comprises a housing 1 having a cover 1a and a bottom 1b and a tubular positive electrode 2. This electrode 2 rests on the lower end of housing 1 and is spaced from cover 1a and is centered in housing 1 by a centering member 1c. The space 25 between member 1c and cover 1a results. A centrally cylindrical flue 3 is located in the tubular void of electrode 2. A negative electrode 4 having a powdered zinc base and jellified electrolyte 5 surround the positive electrode 2. A negative terminal 6 is connected to electrode 4 and a positive terminal 7 for the positive electrode 2 are provided. The flue 3 comprises a tubular conductive current collector 9 mounted in the tubular void of electrode 2. The collector 9 is provided with perforations in its wall 12 permitting the arrival of the air to the catalytic sites of the positive electrode 2.

Figure 2:
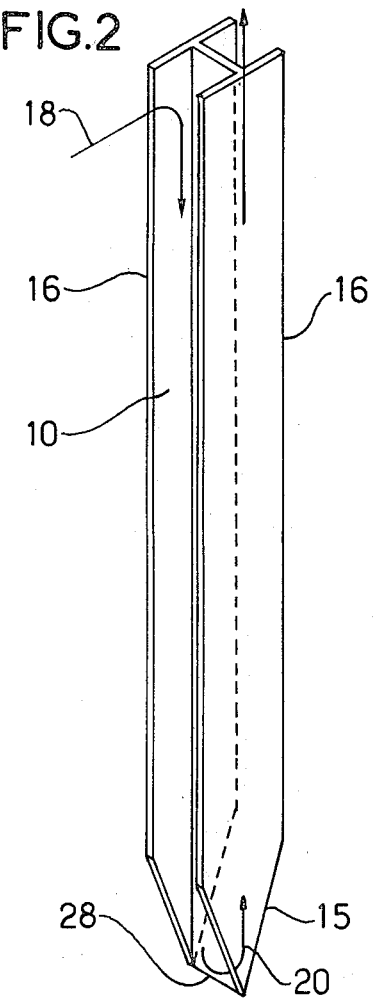
FIG. 2 is a perspective view of a first embodiment of a partition element in accordance with the invention.
Figure 3:
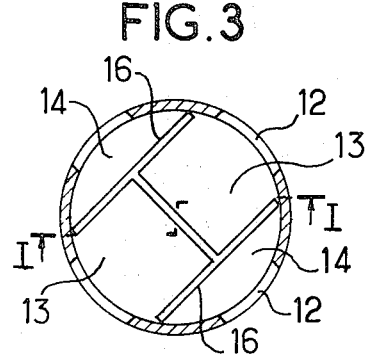
FIG. 3 is a cross-sectional view of the partition element of FIG. 2 as mounted in a perforate current collector.

The apertures 8 in cover 1a open to atmosphere, place the space 25 and upper end of the electrode 2 into communication with said atmosphere outside the cell. The flue 3 is defined by the walls of the collector 9. The latter is provided with a device making it possible to achieve, first, a natural circulation of the air into the cell from the top downwardly along a portion of the positive electrode, and then a circulation from the bottom upward along another portion. To this end, the flue includes a partitioning element 10, FIGS. 2 and 3, mounted inside of the collector 9. As seen in FIG. 3, this partitioning element has a transverse cross-section in the form of a letter H. The parallel legs 16 of element 10 at their lower portion are beveled at 15.

The lateral wall surfaces of the tubular collector 9 are in contact with the internal surface of the tubular positive electrode along the inner periphery of the latter as seen in FIG. 3. The conductive collector 9 is electrically connected to the output terminal 7 of the cell as seen in FIG. 1. In addition, the collector 9 extends beyond the upper end of electrode 2 into space 25. The lateral wall surface of the collector is furthermore perforate at 11 in its upper portion which extends into space 25. Thus, the inside of the collector 9 via orifices 8 and 11 communicates with the ambient air outside of the cell. The partitioning or sectioning element 10 is substantially of the same height as the collector 9. The collector 9 with the element 10 mounted therein defines between them four chambers intercommunicating at their lower portions because of the beveled portions 15, i. e., two chambers 13 identical with one another and two other chambers 14 likewise identical to one another (FIG. 3). The respective volumes of chambers 13 and 14 however, differ from each other. The intercommunication between the chambers at their lower portions is provided by beveling the lower portions 15 of the partitioning member 10.

An identical number of perforations 12 in the wall of collector 9 are provided for each of said chambers 13 and 14, thereby making the air arrival areas on the catalytic sites of the electrode 2 identical. However, as a result of the H-shaped section of the partitioning element 10, the volumes of the chambers 13 are materially superior to those of the chambers 14.

The collector 9 is closed off transversely at its upper end and at its lower end by sealing disks 22 and 23 respectively resting on the inner surfaces of respectively the cover 1a and the bottom 1b of the housing.

The sealing disk 23 may be provided at its upper face with a groove 26 making it possible to position the partitioning element 10 properly with respect to the collector. This positioning results from the entry of the lower extremity 28 of the partitioning element 10 into the groove 26.

When said partitioning element 10 is thus mounted and positioned within the tubular connector 9, the communication between the chambers 13 and 14 inside the collector which are separated by the walls of the partitioning element 10 is achieved by reason of chamfers or tapers 15 at the lower ends of the sectional element 16 on each one of the walls thereof, that separate and define the chambers 13 and 14.

In an embodiment described, the partitioning element 10 is made of polystyrene having a uniform wall thickness of approximately 0.5 mm, a length of 173 mm, the vertical bars 16 (FIGS. 2 and 3) of the H shape are 14 mm wide and the transverse bar is about 10 mm wide in order that the element 10 may be friction-fitted inside of the tubular collector 9 which has an inside diameter of 18 mm, the outer edges of vertical bars 16 then resting snugly against the inner surface of the tubular collector 9, thereby partitioning the flue space 3 into the chambers 13 and 14.

Since the perforations 12 are distributed uniformly about the surface of the collector 9, the following computations are based upon the overall surface area of the collector 9 without regard to its perforations. The following values are derived from the proportionality coefficients of these areas with respect to the chamber volumes which are in the case of the chambers 13, 1.2 and, in the case of the chambers 14, 4.5

The collector 9 exhibits along its surface a plurality of lines of perforations 12 and 11 that lead into chambers 13 and 14 defined by the H-section of the partitioning element 10.

The distribution of entering air is thereby effected as follows: the air enters cell 1, as indicated by arrows 18, via the orifices 8 of the cover 1a. It then passes through the holes 11 leading into the chambers 13, then descends along the longitudinal wall portions of collector 10 defining the outer limits of these two chambers and through perforations 12 supplying oxygen, as indicated by the arrows 19, the active catalytic sites of the positive electrode. The residual air reaching the lower portions of chambers 13 to some extent impoverished of oxygen that reached the catalytic sites via perforations 12, then passes through via the beveled region 15 of element 10 into the lower portions of chambers 14 as indicated by the arrow 20. This residual air rises inside the chambers 14 as indicated by the arrows 29 and then passes through the exit holes 21 arranged in the disk 22 and overlying chambers 14 and emerges finally through the final holes 27 located in the cover 1a of the cell opposite the holes 21.

In view of the fact that, according to the invention, the areas of the like numbered perforations 12 in each of chambers 13 and 14 which provide access to the catalytic sites are proportionally larger for the chambers 14 than for the chambers 13, a greater consumption of oxygen for the chambers 14 than for the chambers results.

This then brings about a draft effect similarly to that of a fireplace stack, caused by the fact that oxygen contained in the air is consumed during transit by reduction on the exposed catalytic sites of the positive electrode. The entering fresh air, comprising practically 79% of nitrogen having an atomic weight of 14 and 21% of oxygen of an atomic weight of 16 is heavier than the emerging residual air. This is so because in transit oxygen has been removed from the air at the active catalytic sites of the positive electrode via perforations 12. Hence, the emerging air via perforation 27 has a larger percentage of nitrogen and a smaller percentage of oxygen and thus is lighter than the air entering the cell via perforations 8.

Figure 4:
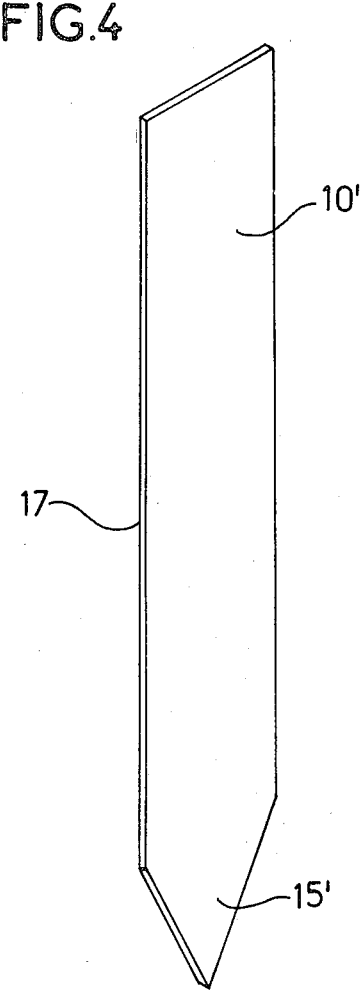
FIG. 4 is a perspective view of a second embodiment of a partition element according to the invention provided in the form of a flat elastic strip.
Figure 5:
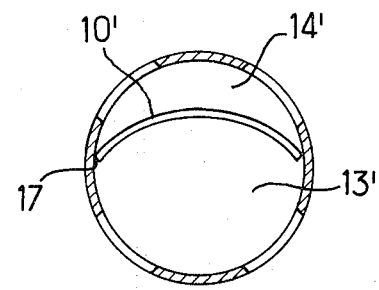
FIG. 5 is a plan view of the partition element of FIG. 4 as mounted and curved as a result of elastic deformation, in a current collector.

In a second embodiment, the partitioning element of the same material as element 10 is a strip 10' as shown in FIGS. 4 and 5 of a thickness of approximately 0.5 mm; it comprises likewise a chamfer or pointed lower end 15', the width of said element 10' being greater than the inside diameter of the collector 9' and the half-length of the circumference defined by the borehole of the collector 9' prior to its introduction into the collector 9'. The strip 10', which is made of a plastic material such as polystyrene, is capable of elastic deformation evenly curves to assume a bowed configuration that is of such extent as to permit its introduction into the collector 9'. Following such introduction, the strip which is resilient tends immediately to resume its flat initial configuration. Since its width is greater than the inner diameter of collector 9', its lateral edges 17 bear against the inside surface of the tubular collector 9', as shown in FIG. 5, thereby defining a chamber 13' of large volume for the arrival of fresh air and the chamber 14' of smaller volume for the rise of oxygen impoverished residual air. The proper positioning of such curved partitioning element 10 with respect to the collector 9' is effected at its upper end by a curvilinear groove (not shown) in the cell arranged in a sealing disc for the upper end of collector 9' similar to disc 22 of the cell of FIG. 1. A sealing disc similar to disc 26 is provided for the lower end of said collector. The two chambers 13' and 14' are in communication at the lower end of curved partition element 10' because of the chamfered or beveled lower end 15' of said element. The air circulation effect in a cell using the curved partitioning element 10' rather than the H shaped partitioning element is produced in like manner because oxygen consumption of greater amount in chamber 14' than in chamber 13' so that the emerging air is lighter than the entering air.

In the specific cell embodiment illustrated in FIG. 1, the positive terminal 7 of the cell is in electric contact with the conductive transverse closure 22 to provide an electrical connection between a portion $10^a$ of the collector 10 that contacts the electrode 2 and the positive terminal 7 of the cell.

Since the collector 10 is in physical contact with the electrode 2, it must be made of a substance that cannot be attacked by the cell electrolytes and, by way of example, can be of steel in the case of an alkaline electrolyte and of carbon or titanium in the case of a saline electrolyte. The negative terminal 6 is connected to the current collector 24 connected to the negative electrode 4.

Similar electric connections between positive electrode and positive terminal and between negative electrode and negative terminal are employed if the cell utilizes the curved partitioning element 10' rather than the H-shaped element 10.

The main advantage common to all embodiments described above, by virtue of the resultant circulation of air, consists in achieving an excellent supply of air and more particularly of oxygen at the active catalytic sites of the positive electrode. The result is that the partial pressure of the oxygen in the constantly replenished air due to induced circulation is at all times greater than that which would be present in a cell without the partitioning arrangements of this invention. This has the effect of increasing the rate of electrochemical reduction of oxygen on the active catalytic sites of the positive electrode and, correlatively, and correspondingly an improved potential.

Comparative measurements were made on the one hand with a cell A not comprising the partitioning means according to the invention and, on the other, on a cell B of similar type and dimensions but comprising the partitioning means of the invention in accordance with FIG. 1.

The cells tested were single alkaline electrolyte air-zinc cells whose sizes were 85 × 85 × 180 mm, each comprising a cathode made of actived carbon, an anode of finely divided or powdered zinc, and a potassium hydroxide electrolyte immobilized by a gel.

On the basis of the test results, the conclusion is that there is a clear improvement in operation with cells embodying the invention which is verified by the experimental tests.

FIG. 6 illustrates that the cell voltage of a cell B embodying the invention remains nearly constant during useful life, whereas, in the case of the similar cell A in which the partitioning elements of this invention are omitted and, as seen by curve A, the cell voltage is not only lower, but also fluctuating during useful cell life. In this figure, representative curves are reproduced of voltage during the continuous discharge through a 2-Ohm resistor as a function of time. The time T (abscissae) is in days and the output voltage U (ordinates) in volts.

FIG. 7 shows the characteristics of the voltage (ordinates) at the terminals of respective cells A and B like those of FIG. 6 as a function of the intensity of the current in amperes supplied (abscissae). It is to be observed that the reduction in voltage is, on the one hand, more even and, on the other, distinctly less accentuated in the case of the cell B embodying the invention.

In detail, these measurements produced the following results:

Cell A:
| | |
|---|---|
| Electromotive force | 1.43 volt |
| Voltage on a 5 Ohm load | 1.22 volt |
| Continuous discharge capacity through a 5 Ohm load to a terminal voltage of 0.9V) | 330 Ah |
| Voltage through a 2 Ohm load | 0.91 volt |
| Continuous discharge capacity through a 2 Ohm load to a terminal voltage of 0.8 V | 330 Ah |

Cell B:
| | |
|---|---|
| Electromotive force | 1.43 volt |
| Voltage on 5 Ohm load | 1.26 volt |
| Continuous discharge capacity through a 5 Ohm load to a terminal voltage of 0.9 V | 350 Ah |
| Voltage through a 2-Ohm load | 1.15 volt |
| Discharge capacity through a 2 Ohm load to a terminal voltage of 0.9 | 330 Ah |
| Voltage through a 1 Ohm load | 0.98 volt |
| Continuous discharge capacity through a 1 Ohm to a terminal voltage of 0.9 V | 300 Ah |

It can therefore be seen that the introduction of a partitioning element shaped in accordance with the invention within the collector has significantly improved the operating voltage of the cell, said improvement being spectacular in the case of heavy outputs: 1.15 volts instead of 0.91 volts for a discharge through a two Ohm load, which represents an energy gain equivalent to: $(1.15 - 0.91)/0.91 - 26\%$ and an even greater power gain if it is taken into account the fact that a cell discharged through a fixed resistor supplies a greater amount of current if its voltage at its terminals is greater.

It should likewise be noted that the cell according to the invention discharged through a 1 Ohm load has a better voltage at the terminals (0.98 volts) than an unimproved cell A discharged through a 2 Ohm load which indicates a voltage of 0.91 volts. This unimproved A type cell is bound to provide an inadequate discharge if attempts are made to discharge it through a 1 Ohm load.

It is of course understood that since the invention is not limited to the embodiments described and illustrated, variations within the scope of the claims can be made with changes in details, and alterations of certain arrangements or replacements of certain means by equivalent means. In particular, the flue within the positive electrode could have a cross-section other than circular, such as a square or ovoid shape which would permit the operative use of partitioning elements of diverse configurations besides those described that could be made of a substance other than polystyrene, as, for instance, polyethylene, polyamid, polyvinyl chloride or other suitable materials.

What is claimed is:

1. Air depolarization cell comprising a negative electrode having a zinc base, an electrolyte, and a positive electrode, means for supplying circulating air to said positive electrode comprising a flue in the said positive electrode, in communication with the outside air at its upper portion, a tubular conductive collector lining said flue in its length and extending outwardly of said upper portion, partitioning means of a length substantially equal to the length of said collector positioned within said collector and defining at least two longitudinal chambers of different volumes therein communicating at their lower portions and the said collector having perforations in each of said chambers exposing catalytic sites of said positive electrode in said flue to air, the proportionality coefficients of the air input surfaces at the catalytic sites of said positive electrode via said perforations with respect to the corresponding volumes of the respective chambers being different.

2. Cell according to claim 1, characterized by the fact that the partitioning means is chamfered at its lower portion to permit intercommunication between siad chambers at this portion.

3. Cell according to claim 1, characterized in that at least two chambers communicate with the outside air through separate openings.

4. Cell according to one of the claims 1 characterized in that the circumferential wall of said flue is lined by said metallic collector, said collector being in the shape of a perforated tube.

5. Cell according to claim 1, characterized in that the partitioning means has a transverse cross-section in the form of a letter H, the two outer edges of each one of the two vertical bars of the said H resting against the inside wall of the tubular collector.

6. Cell according to claim 1 characterized in that the partitioning means is a flat strip of greater width than the diameter of said collector and in position within said collector is deformed elastically to curved shape providing two longitudinally extending chambers of different volumes in said collector, said strip having a chamfered portion permitting intercommunication between said chambers.

7. An air depolarization cell comprising a casing having therein a negative electrode, an electrolyte and a positive electrode, and means for effecting air circulation from the atmosphere to catalytic sites of said positive electrode within said cell, said means comprising providing a flue in said positive electrode, partitioning means for subdividing said flue into compartments of differing volumes communicating with each other at one end only, means in said flue providing like air access to catalytic sites of said positive electrode in each chamber, means for permitting entry of atmospheric air into the chamber of larger volume and for discharging exhaust air from the chamber of smaller volume, said partitioning means being so positioned that the resultant different volumes provide a draft effect causing entry of atmospheric air into the chamber of larger volume and the discharging of air from the chamber of smaller volume.

8. An air depolarization cell according to claim 7 including a conductive tubular collector lining said flue, said collector having a like number of perforations in each of said chambers, which perforations provide said air access in said chambers to said catalytic sites of said positive electrode.

9. An air depolarizing cell according to claim 8 including closure means for said collector, and closure means at the opposite end of said collector having an exhaust air opening communicating with one of said chambers to atmosphere, and said collector also having an air intake opening providing an entry for atmospheric air to the other of said chambers for circulation in both said chambers and discharge through said exhaust opening.

10. An air depolarization cell according to claim 1 including a positive terminal and a negative terminal, means for connecting the negative terminal to said negative electrode and means for connecting said collector to said positive terminal.

11. Air depolarization cell comprising a negative electrode having a zinc base, an electrolyte, and a positive electrode, means for supplying circulating air to said positive electrode comprising a flue in the said positive electrode in communication with the outside air at its upper portion, a tubular conductive collector lining said flue in its length and extending outwardly of said upper portion, partitioning means of a length substantially equal to the length of said collector positioned within said collector and defining at least two longitudinal chambers of different volumes therein communicating at their lower portions, said partitioning means having a transverse cross section in the form of a letter H, the two outer edges of each one of the two vertical bars of said H resting against the inside wall of the tubular collector.

12. An air depolarization cell comprising a casing having therein a negative electrode, an electrolyte and a positive electrode, and means for circulating air from the atmosphere to catalytic sites of said positive electrode within said cell, said means comprising providing a flue in said positive electrode, partitioning means for subdividing said flue into compartments of differing volumes communicating with each other at one end only, means in said flue providing like air access to catalytic sites of said positive electrode in each chamber, means for permitting entry of atmospheric air into the chamber of larger volume and for discharging exhaust air from the chamber of smaller volume, a conductive tubular collector lining said flue, said collector having a like number of perforations in each of said chambers, which perforations provide air access in said chambers to catalytic sites of said positive electrode, and closure means to opposite ends of said collector having an exhaust air opening communicating one of said chambers to atmosphere and said collector also having an air intake opening providing an entry for atmospheric air to the other of said chambers for circulating in both said chambers and discharge through said exhaust opening.

* * * * *